UNITED STATES PATENT OFFICE.

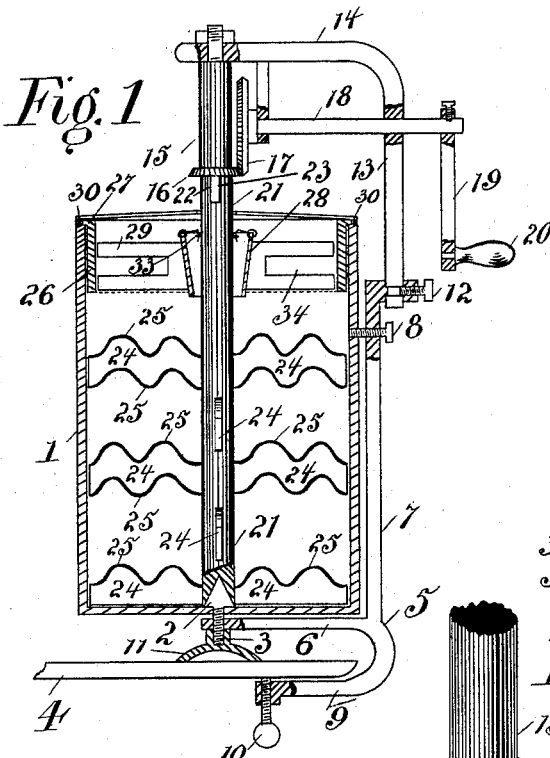

ISAAC LOBREE, OF SAN FRANCISCO, CALIFORNIA.

DOUGH OR BATTER KNEADER.

SPECIFICATION forming part of Letters Patent No. 522,909, dated July 10, 1894.

Application filed March 5, 1894. Serial No. 502,421. (No model.)

*To all whom it may concern:*

Be it known that I, ISAAC LOBREE, a citizen of the United States, residing at San Francisco, in the county of San Francisco and State of California, have invented new and useful Improvements in Dough or Batter Kneaders, of which the following is a specification.

My invention is an improvement in dough or batter kneaders and is designed for its simplicity and cheapness of construction and efficiency of operation.

The prime object of my invention is to provide a simple device, by the use of which the necessity of contact between the hands and the ingredients mixed is entirely obviated, and further that the dough can be more thoroughly and quickly kneaded than by the ordinary hand process.

The novelty resides in the peculiarities of construction and the combinations, arrangements and adaptation of parts, all as more fully hereinafter described, shown in the drawings, and then particularly pointed out in the appended claims.

The invention is clearly illustrated in the accompanying drawings, which, with the numerals of reference marked thereon, form a part of this specification, and in which—

Figure 1 is a vertical section of my device attached to a table. Fig. 2 is a plan view of the same. Fig. 3 is a perspective view of the outer casing or vessel. Fig. 4 is a perspective view of the sieve with a portion of the front wall broken away. Fig. 5 is a perspective view of a detail, and Fig. 6 is a perspective view of a portion of the mixers or kneaders.

Reference being had to the above views 1 represents a cylindrical vessel in which the ingredients composing the dough are agitated and thoroughly mixed by mechanism to be described hereinafter. Situated in the bottom of this vessel 1 is a cone shaped bearing 2, the base of which terminates in a threaded projection 3 which passes through the bottom of the containing vessel 1.

In order to hold the vessel 1 in a rigid position on a table 4 I have provided a clamping frame 5 having a horizontal and a vertical arm 6 and 7 respectively, the former 6 being secured to the threaded projection 3 on the cone bearing 2, while the latter 7 is secured to the vertical side of the vessel 1 by means of a bolt or screw 8. The lower part of the clamping frame 5 terminates in a yoke-shaped arm 9, the extremity of the latter bearing a binding screw 10. Between the horizontal arms 6 and 9 and screwed to the threaded projection 3 is a cup-shaped support 11 between which and the binding screw 10 the surface of the table 4 is clamped.

Revolubly secured to the upper extremity of the vertical arm 7 of the clamping frame 5 by means of the screw 12 is a frame 13 the upper end 14 of which extends over the center of the vessel 1. Pivotally secured to the frame 13 and directly over the center of the vessel 1 is a vertical shaft 15 bearing at its lower extremity a bevel gear wheel 16 the teeth of which mesh with corresponding teeth on a second gear wheel 17 which is rigidly secured to a horizontal shaft 18 having suitable bearings in the frame 13. The axis of revolution of the gear wheels being at right angles to each other.

To the outer extremity of the horizontal shaft 18 is secured a crank-arm 19 having a suitable handle 20 by means of which a revolving motion is imparted to the shaft 18 which motion is transmitted, through the gears 17 and 16, to the vertical shaft 15.

Extending vertically upward in the center of the containing vessel 1 and resting on the cone 2 as a bearing, is the shaft 21, the upper extremity of which contains the slot 22 into which is adapted to engage a flattened projection 23 on the lower surface of the gear wheel 16. Fig. 5 is a perspective view showing the connection between the shaft 21 and gear wheel 16.

Rigidly secured to the vertical shaft 21 and extending radially outward from it, are a series of fingers or kneaders 24, each radiating arm having on its upper and lower surface a series of irregular corrugations or projections 25. Immediately above the arms 24 and encircling the vertical shaft 21 is a sieve 26 shown in perspective in Fig. 4 which has an outwardly extending rim or projection 27 the latter being adapted to rest on the upper rim of the containing vessel 1.

Positioned between the bottom of the sieve 26 and the shaft 21 and encircling the latter is the funnel 28 from which extends two or more radiating arms 29 adapted to rest on the bottom of the sieve.

I will now explain the method of operation of my invention and the function of each individual part.

As the horizontal shaft 18 is caused to revolve by motion imparted to the crank arm 19, a revolving motion is transmitted to the vertical shaft 15 through the gear wheels 17 and 16, and the shaft 21 assuming the same motion. During the revolution of this central shaft 21 and arms 24 which are rigidly secured thereto, the sieve 26 is held in a stationary position by means of the pins 30 which extend upwardly from the upper rim of the vessel 1 and enter the holes 31 in the projecting rim 27 of the sieve 26. By means of the hooks 32 which are secured to the upper rim of the funnel 28 and engage with staples 33 on the vertical shaft 21 the funnel 28 is caused to revolve as the shaft 21 revolves and the arms 29 revolve over the bottom surface of the sieve. The required amount of flour is now deposited in the sieve and the arms 29 revolving therein, crush all the larger particles and at the same time clear the surface of the sieve as certain quantities of flour pass through. The object of the open portion 34 of the arms 29 being to prevent the piling up of the flour as the funnel revolves. The liquid ingredients are then poured into the funnel 28 through which they are conducted to the containing vessel 1. The revolving motion of the arms 24 is continued until the ingredients are thoroughly mixed and the required lightness of the dough attained.

When it is desired to remove a certain quantity of dough the threaded cap 35 which screws over a projection encircling a perforation near the bottom of the vessel 1, shown in Fig. 3, is removed and the dough allowed to escape into suitable molding pans situated on the table 4. In order to readily stop the flow of material from the vessel 1 I have provided the sliding cutter 36 which travels in projecting parallel grooves 37 on the outer surface of the vessel 1. It will be readily seen that by forcing this slide 36 downward over the opening in the vessel 1 the flow of material is immediately cut off.

It is obvious that by loosing the screw 8 and revolving the frame 13 until the projection 23 on the shaft 15 passes from the slot 22 in the shaft 21, the funnel 28, sieve 26 and shaft 21 can be quickly and readily removed from the vessel 1 and each part thoroughly cleaned.

In order to prevent any dust or foreign material from entering the vessel 1 I have provided the semicircular lids 38 which are hinged to the vessel 1 and adapted, when closed, to completely close the upper end of the latter.

I do not desire to confine myself to any particular number of projecting arms 24 or 29 as the number of such arms may vary according to the capacity of the vessel.

It is manifest that each corrugation or projection 25 on the radiating arms 24 exerts a kneading motion to the dough, equal to that imparted by hand to an ordinary spoon, and consequently the aggregate number of corrugations or projections revolving simultaneously are equal in effect to a like number of ordinary spoons moving simultaneously within the dough, and therefore by inference it will be readily seen that the degree of efficiency of my device over the ordinary hand process is multiplied in a direct proportion to the number of spoons.

I am aware that changes in the form and proportion of the devices herein shown and described as an embodiment of my invention can be made without departing from the spirit or sacrificing the advantages thereof, and I therefore reserve the right to make such changes and alterations as fairly fall within the scope of my invention.

By the improved construction herein shown and described, I am enabled to manufacture and place on the market a superior article, simple in construction and efficient in operation, at a very moderate cost and thus to meet the demands of the trade.

Having thus fully described my invention, what I claim, and desire to secure by Letters Patent, is—

1. In a dough or batter kneader, the combination of a stationary containing vessel, with a revoluble shaft in said vessel, said shaft bearing one or more radiating arms, a sieve encircling said shaft and positioned near the top of said vessel, and a funnel projecting through the center of said sieve and encircling said shaft substantially as shown and described.

2. In a dough or batter kneader, the combination of a stationary vessel with a revoluble shaft in said vessel, said shaft bearing one or more radiating arms, a sieve situated near the top of said vessel and encircling said shaft, a funnel passing through the bottom of said sieve and encircling said shaft, and one or more arms secured to and radiating from said funnel, said latter arms being adapted to revolve about said shaft as a center, substantially as and for the purpose set forth.

3. In a dough or batter kneader, the combination of a stationary vessel with a revoluble shaft in said vessel, said shaft bearing one or more radiating arms, said arms having a series of corrugations on their upper and lower surface, a sieve situated near the top of said vessel and encircling said shaft, a funnel passing through the bottom of said sieve and encircling said shaft, and one or more forked arms secured to and radiating from said funnel, said forked arms being adapted to revolve about said shaft as a center, substantially as and for the purpose set forth.

4. In a dough or batter kneader, the combination of a stationary vessel, with a revoluble shaft in said vessel, said shaft bearing a series of radiating arms, a removable sieve situated in said vessel and encircling said shaft, a funnel passing through the bottom of said sieve and detachably secured to said shaft, said funnel bearing one or more radiating forked arms, a revoluble frame situated without said vessel, a vertical revoluble shaft supported by said frame and detachable means for connecting said latter shaft with said arm bearing shaft, substantially as and for the purpose set forth.

5. In a dough or batter kneader the combination of the stationary vessel 1, with the vertical shaft 21 situated within said vessel, radiating arms 24 secured to said shaft, sieve 26 situated near the top of said vessel, funnel 28 within said sieve, arms 29 secured to said funnel, shaft 15 and gear wheels 16 and 17 supported by the revoluble frame 13, and projection 23 on said shaft 15, said projection being adapted to engage with a slot 22 in shaft 21, and cap 35 and slide 36 situated near the bottom of said vessel 1, substantially as and for the purpose set forth.

In testimony whereof I affix my signature in presence of two witnesses.

ISAAC LOBREE.

Witnesses:
A. C. HAMMOND, Jr.,
W. A. MATHEWS.